July 12, 1966  C. D. NITCHIE ETAL  3,260,142
CONTROL SYSTEM
Filed April 10, 1964  3 Sheets-Sheet 1
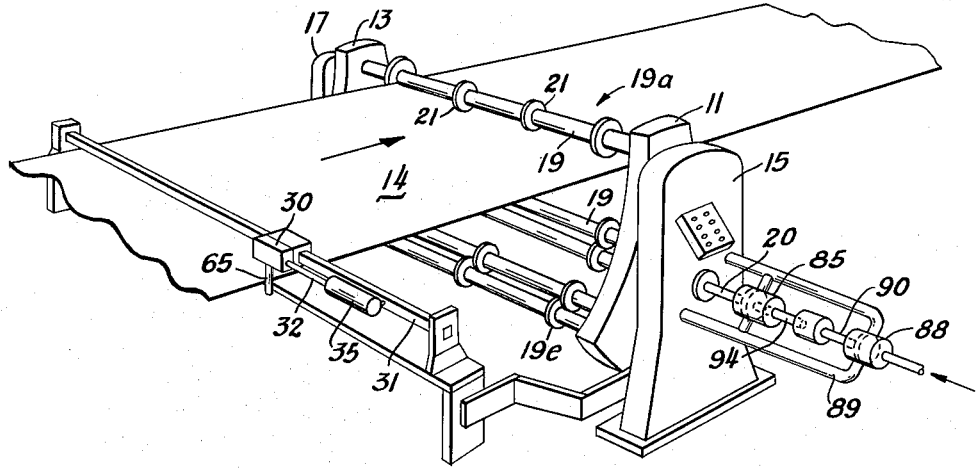
FIG. 1
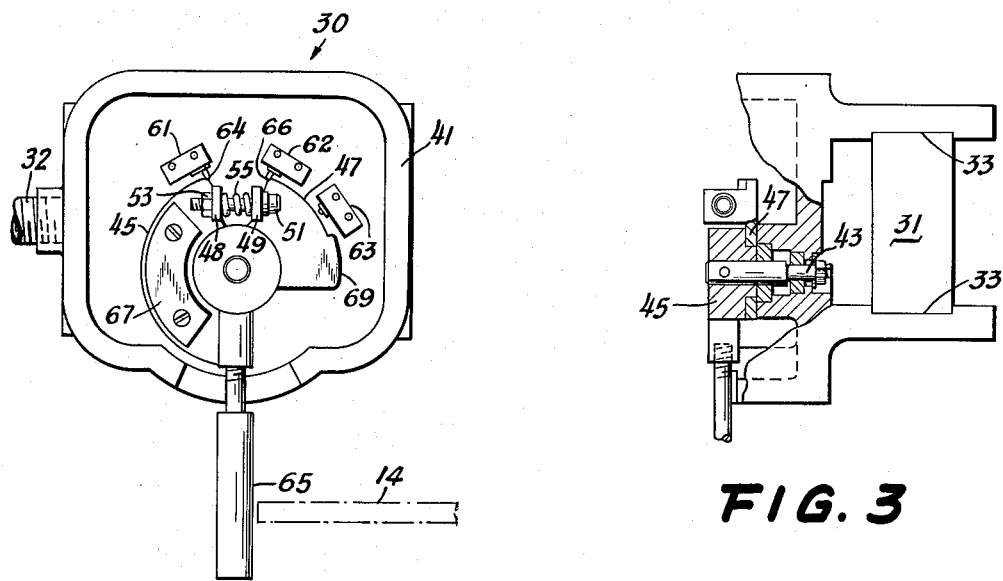
FIG. 2
FIG. 3
INVENTORS
CHARLES D. NITCHIE &
THOMAS H. PARIS
BY Oscar B Brumback
their Attorney 3,260,142
CONTROL SYSTEM
Charles D. Nitchie, Baltimore, Md., and Thomas H. Paris, Trenton, N.J., assignors to Koppers Company, Inc., a corporation of Delaware
Filed Apr. 10, 1964, Ser. No. 358,886
7 Claims. (Cl. 83—72)

This invention relates generally to apparatus for following the edge of a web.

In operations involving a moving web such as a piece of paper, corrugated board or textile due to tension on the roll, length of travel of the material, and the like, the material is likely to become displaced from the center line of the machine no matter how carefully the edge of the material is made. Such displaced material is normally trimmed from the moving web, but it is wasteful to cut one edge without knowing the relative position of the other edge.

As an example, in the production of corrugated board, a machine known in the art as a slitter-scorer trims the edges of the longitudinally moving web and at the same time makes score lines necessary for subsequent operations on the web, when it is to be made into boxes. The long web of corrugated board has the tendency to move slightly from side to side in its longitudinal travel because of production difficulties and also because the length, weight, and physical distance the board traverses in the processing stations that are required for the production of the board. It is desirable that the slitters and scorers for this board be closely controlled relative to the edge of the board so as to minimize waste.

This invention provides a novel apparatus for controlling the position of a tool in accordance with the edge of a web. The apparatus includes a sensor responsive to the edge of the web, a means for moving the sensor out of contact with the web, a means for centering the tool relative to the web, a means for rapidly engaging the sensor with the web, a means for bringing the sensor to a centered or neutral position at a slow speed and for thereafter tracking the edge of the web with the sensor and causing the tool to follow the sensor as any deviation occurs in the position of the edge of the web. Also included are a means for moving the tool relative to the sensor.

The above and further novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike.

FIGURE 1 illustrates partially schematically and partially isometrically a conventional slitter-scorer mechanism embodying the novel controls of the present invention;

FIGURE 2 is an elevation front view of the novel sensor illustrated in connection with FIG. 1;

FIGURE 3 is a side view of FIG. 2;

Figure 4:
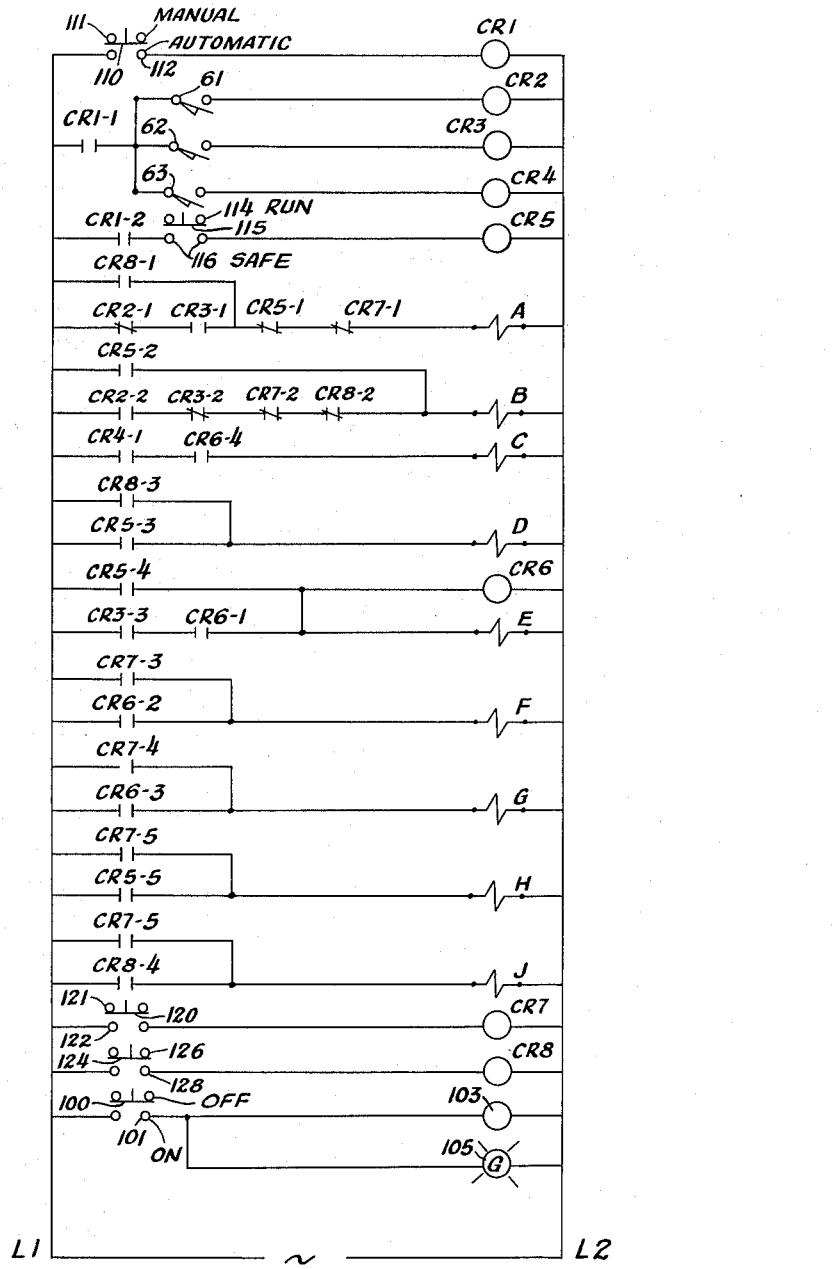
FIGURE 4 is a schematic diagram of the electrical control system.

In the drawings, the invention is illustrated as being incorporated into a conventional slitter-scorer. Referring to FIG. 1, two spaced apart subframes 11 and 13 are rotatably mounted on main stanchions 15, 17. These subframes are of a generally triangular configuration and carry three pairs of shafts 19. These shafts each contain pairs of cutters and scoreheads, such as, for example, illustrated at 21. This is conventional practice so that, for example, as illustrated in FIG. 1, while pairs of slitters, scorers 19a are operating upon the web 14, the other pairs of cutters 19c can be adjusted for the next production run. The subframes 11 and 13 are rotated about pivot shaft 20 in the conventional manner to place the operating rolls 19 in the position to operate on the web 14. The operating shafts 19 with the attached slitters and scoring heads are driven through a motor and a drive mechanism (not shown) as is conventional.

It can be seen, therefore, that it is desirable to control the position of the slitters and scorers with respect to the edge of the board. In accordance with this invention, a novel arrangement is provided for sensing the edge of the moving web of corrugated board and for maintaining the cutters a predetermined distance from this edge.

The novel sensor 30, FIG. 2, is responsive to the edge of the board. Sensor 30 is slidably mounted on a bar 31 which, in turn, is mounted on top of the frames of the slitter-scorer. As shown in FIG. 3, the sensing head is provided with grooves 33 for engagement with bar 31. A conventional hydraulic ram 35 is also fastened to bar 31 and attached by shaft 32 to head 30 for positioning the head on the bar. The other end of shaft 32 is connected to a piston 37 within ram 35. Upon the application of hydraulic fluid to one end or the other of the ram 35, the piston is driven to the right or to the left. In this manner, sensor 30 can be moved to the right or to the left along the bar 31.

The sensor 30 comprises a housing 41 in which a shaft 43 is rotatable. Secured to shaft 43 is a semicircular cam 45 and journaled on cam 45 is a further cam 47. To secure these two cams together lugs 48 and 49 project respectively from the cams and are tied together by a cap screw 51 and nut 53. By threading nut 53 on cap screw 51, the position of cams 45 and 47 can be changed. A spring 55 surrounds cap screw 51 and biases the lugs 48, 49 apart.

Mounted on housing 41 are three limit switches 61, 62, and 63. Switches 61 and 62 operate to change the axial position of the slitter-scorer shafts and switch 63 causes the sensor to move to engage the web from the safe position and also controls the rate of speed at which the sensor moves to engage the web. At the position shown, the sensor is in its null position; the switches 62, 63, and 64 are all open.

Dependent from cam 45 is a finger 65 for engaging the edge of the web 14. Advantageously, the finger is of rectangular cross section and may, for example, be threaded into cam 45. A counterweight 67 on cam 45 tends to bias the finger 65 in a counterclockwise direction to engage the web 14. When finger 65 is engaging the edge of web 14 in the running position, the cams 45 and 47 are in a neutral position, as shown. At this time, switches 61 and 62 have just cleared the edges 64, 66 of the cams. Upon a rotation in either direction caused by the edge of the web moving the finger, one of the switches 61 or 62 is closed. Thus, by the position of the switches 61 and 62, a determination is made as to the position of the edge of web 14 with respect to a predetermined neutral position. If, for example, the board moves to the right, the finger 65 moves to the right to follow the board. At this time, switch 62 comes into engagement with the cam surface 66 of cam 47. The switch 61 remains free of the surface 64 of cam 45.

Cam 47 also includes a further cam surface 69 which engages switch 63. When there is no web to engage finger 65, the finger will move in a counterclockwise direction due to counterweight 67 and after a predetermined amount of movement, cam surface 69 will engage the switch 63. This occurs at the time that the sensor has been moved away from the web to the safe position in one of the changes in operation.

The position of the edge of the web is sensed, and as switch 61 or 62 is actuated, the slitter-scorer mechanism is moved to follow the edge of the web. To provide for the movement of the slitter-scorer mechanism, the pivot shaft 20 by which subassembly 11 and 13 is journaled in main frames 15 and 17 is supported in the main frames by conventional axial type roller bearings. Thus, the pivot shaft 20 is capable of axial movement through the bearings. When this pivot shaft 20 is moved axially, the subframes 11 and 13 are also moved axially thereby carrying the shafts 19 and the slitting and scoring heads axially therewith. The movement of the pivot shaft 20 is provided by a hydraulic cylinder 85 secured in a conventional manner to the support 89 which support is secured to one of the main frames 15. One end of the piston 87 in cylinder 85 is connected to the pivot shaft 20. It can be seen that the application of hydraulic fluid to one side or the other of piston 87 will result in axial movement of pivot shaft 20 and, consequently, of the subassembly 11, 13. A second hydraulic cylinder 88 is secured to the support element 89 and positioned so that one end of the rod 90 of piston 91 is opposite to the end of the actuator rod 94 of piston 87 and in axial alignment therewith.

Piston 91 of cylinder 88 is substantially larger than the piston 87 of cylinder 85. Thus, with the same line pressure, piston 91 will override the piston 87 and displace it in the right-hand direction. Also, the stroke of the piston 91 is only half the stroke of the piston 87. Since piston 91 overrides the piston 87, it will travel its full stroke so that what it does, in effect, is to position the piston 87 in its central position in cylinder 85 and block it there. Piston 87 tends to be pushed towards the piston 91 by the line pressure, but due to the larger surface of the piston 91, this overcomes the force of the piston 87 and centers the piston 87 in its cylinder 85. Also, this positions the slitter-scorer shafts in a central position with respect to prime supports 15 and 17.

Figure 5:
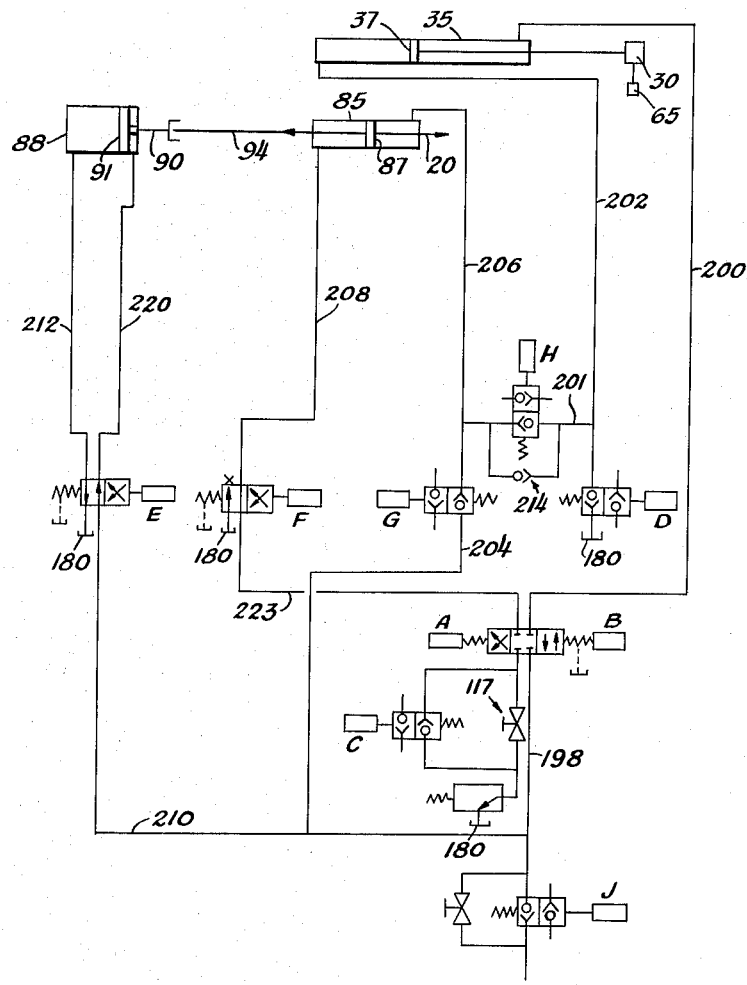
FIGURE 5 is a schematic diagram of the hydraulic control system.

The electrical portion of the controls for causing the slitter-scorer mechanism to follow the edge of the web are shown schematically in FIG. 4, and the hydraulic arrangement controlled thereby is shown in FIG. 5. The electrical energy, in accordance with this invention, may be supplied across a conventional 110 volt line, such for example as, $L_1$ and $L_2$. When the "on-off" switch 100 bridges contacts 101, a conventional hydraulic pumping unit 103 is placed into operation to supply pressure fluid to the various hydraulic components, and a green light 105 glows to show that the system is in the operable condition. When the switch 110 is moved from the manual position 111 to the automatic position 112, the automatic position relay CR1 is energized engaging contacts CR1–1 to energize the switches 61, 62, and 63 of the sensor 30, and the selector switch 115 which is the safe-run switch by way of contacts CR1–2. The switches 61, 62, and 63 are actuated by the finger 65 of the sensor 30. Switches 61, 62 and 63 energize relays CR2, CR3 and CR4, respectively. The bridging of contacts 116 by switch 115 energizes relay CR5 to close contacts CR5–4 and thereby energizes relay CR6. This actuates valves B, C, D, E, F, G, and H. Referring to FIG. 5, valve B directs the pressure fluid from line 198 to cylinder 35 through lines 200. Valve H separates the series circuits by blocking line 201 so that the fluid returns through line 202 and valve D to the tank 180. Valve G directs fluid from line 204 through line 206 to the pivot shaft cylinder 85 moving the slitter-scorer pivot shaft 20 towards the center of the supports 15, 17. The pressure fluid exhausts through line 208 and valve F to the tank 180. Valve E sends pressure fluid from line 210 through line 212 to cylinder 88 thereby blocking movement of the piston 87. Since piston 91 is larger than piston 87, piston 91 prevails and centers piston 87 in its cylinder 85.

At the end of this cycle, the sensor 30 is removed to its most remote position with respect to the web. The piston 87 is in the center of cylinder 85 and correspondingly, the slittter-scorer mechanisms are centered with respect to the stanchions 15, 17. At this time, any splicing of the web can be made or other corrections or changes that need be made in the position of the slitter or score heads on the shafts or any other work that needs be done or changes made in the mechanism can be made at this time.

When it is desired to place the machinery back into operation, switch 115 is moved into engagement with contacts 114 to the run position. This opens the circuit to relay CR5 thereby de-energizing the relay. Relays CR3 and CR4, however, are still in a position to be energized by the sensor 30. Relay CR6, however, remains energized due to the holding circuit resulting from engagement of the contacts CR3–3 and CR6–1. The valves now actuated are A, C, E, F, and G. Fluid is directed by line 204 to valve G and through the bypass 214 and line 202 to cylinder 35 thereby moving the sensor head 30 in a direction to contact the web. This moves the sensor 30 at a high rate of speed toward the web. The piston 87 in cylinder 85, however, is still locked in central position by piston 91.

When the sensing finger 65 contacts the edge of the web 14, the sensor 30 continues to move, but the cams 45, 47 are being rotated in a clockwise position. After a predetermined slight movement from counterclockwise displaced position, switch 63 is opened due to the switch riding off the cam surface 69. At this time, switch 63 opens, de-energizing solenoid CR4. This de-energizes solenoid C and valve C and thus forces the pressure fluid to go through the conventional restrictor 117. Accordingly, the sensor then seeks its null position at slow speed. When the null position has been reached, all valves are de-energized. The piston 91 in blocking cylinder 88 will retract since fluid flows from line 210 and line 220 to cylinder 88; fluid exhausts through line 212 to tank 180. Valve H presents a series circuit between cylinders 35 and 85 causing them to move in unison in response to switch 61 or 62 of the sensor 30. All high speed operations are now canceled out until the selector switch 115 is again placed in the safe position to retract the sensor head 30 away from the paper and to center the cutting and scoring units relative to the stanchions 15, 17. At this time, the control system is in a state of rest.

Upon any deviation of the web 14 from this rest position, one of the switches 61 and 62 is actuated to cause a change in the position of the shaft carrying the slitter-scorers to follow the position of the web 14. For example, upon a movement of the finger 65 is a direction to cause a closing of switch 61 (that is, if the edge of the web has rotated the finger 65 in a clockwise direction) contact relay CR2 is energized. This actuates solenoid B whereupon pressure fluid flows to move piston 37 by way of line 200. The exhaust fluid then flows by way of lines 202 and 201 through valve H then through line 206 to cylinder 85. Exhaust fluid flows from cylinder 85 through line 208 to valve F to line 223 and valve B through restrictor valve 117 to the tank 180. Conversely when switch 62 is actuated by the web moving away from finger 65, contact relay CR3 is energized and valve A is actuated. Pressure fluid flows by way of 198, valve A, line 223 valve F, and line 208 to cylinder 85. The fluid exhausts from the cylinder 85 through line 206 and bypass 214, lines 201 and 206 to cylinder 35. The fluid from the cylinder 35 exhausts through line 200, valve A and restrictor 117 to tank 180.

It may be that the operator will desire to cut more from one side of the board than from the other or it may be that the board, itself, is not passing centrally through the stanchions 15, 17. In this event, the operator may change the relative position of the sensor 30 and the shaft 19 with its slitter-scorers. An adjustment can readily be made by actuating either bridge 120 from contacts 121 to contacts 122 or changing bridge 124 from contacts 126 into engagement with contacts 128. Engaging bridge 120 with contacts 122, for example, energizes relay CR7. This, in turn, energizes solenoids F, G, H, J. Valve J blocks the fluid coming from the pump causing it to flow through the adjustable restrictor valve to G for slow speed operation. Valve H is closed so fluid is directed to the cylinder 85 moving the pivot shaft 20. Valve F is opened to return the fluid to the tank. When the pivot shaft 20 has been moved to its sufficient distance, the bridge is moved in to engage contacts 121 thereby de-energizing solenoid CR7 and again de-energizing valves F, G, H, J. Similarly, when bridge 124 is moved from contacts 126 to engage contacts 128, the solenoid CR8 is energized. This, in turn, energizes valves A, D, J. Valve J performs the same function as above to restrict the speed of the pivot shaft 20. Valve A directs the fluid to the cylinder 85. Valve D is opened to exhaust the fluid to the tank 180.

When it is desired to operate the mechanism manually and still retain hydraulic control of the pivot shaft 20, switch 110 is moved from automatic to manual whereby it bridges contacts 111. At this time, relay CR1 is de-energized thereby de-energizing the sensor 30, as well as the switch 115. Actuating switch 120 or switch 126, however, moves the pivot shaft 20 to the right or the left in the manner described above as desired by the operator.

The foregoing system provides the operator with great flexibility in the operation of the equipment. At the initial start of the operation, the sensor 30 is in its extreme inoperative position. The pivot shaft 20 which holds the slitter-scorers is at its central position. Upon placing the switch 110 in its automatic position engaging contacts 112, the system is ready for automatic operation. When it is to be placed into operation, the switch 115 is moved to its run position in engagement with contacts 114. Immediately, the sensor at a high rate of speed moves to engage the edge of the web 14. After engagement with the web, the sensor switches 62 and 63 become effective to slow down the speed at which the null position of the sensor is reached. This prevents any overrunning of the system. Upon reaching a null position, the blocking action by piston 91 which has kept the slitter-scorer pivot shaft 20 in a central position is removed and the slitter-scorer mechanism can immediately follow the edge of the web. If the operator desires to change the relative position of the slitter-scorer with respect to sensor 30, he can move shaft 20 by actuating switch 120 or switch 124. If at any time he wishes to discontinue the following operation of sensor 30, switch 110 is moved to the manual position in engagement with contacts 111. At this time, the position of the slitter-scorer, that is, the position of the pivot shaft 20, is fixed; however, if the operator wishes to use the hydraulic system to change the position, he has only to move switches 120 or 124 to drive the shaft to its desired position.

The foregoing has presented a novel system for controlling one apparatus relative to the web edge. The sensor system is a simple system having a few movable parts and susceptible to ready maintenance. Of great advantage is the fact that all adjustments are made from a central position. When, for example, a change is made from a web of relatively narrow to a web of a relatively great width, the sensor rapidly goes out away from the central position away from the web. The slitter-scorers or other mechanisms are immediately centered and any adjustments are made from this central position.

We claim:

1. Slitter-scorer apparatus for a web comprising a pair of shafts for holding the slitter-scorer device for the web, means for automatically centering said shafts in a central position, a sensor for sensing the position of the edge of said web, means for displacing the sensor to its extreme inoperative position, means for moving said sensor at one rate of speed into contact with the edge of said web, means for changing the rate of movement of said sensor after contact with said web, and shaft position control means responsive to said sensor for thereafter controlling the axial position of said shafts from said central position.

2. The apparatus of claim 1 wherein said shaft position control means includes means for changing the relative position of said shafts and said sensor.

3. A sensor for determining the edge of a web comprising a head, a pair of cams rotatably mounted in said head for conjoint rotation, a finger dependent from one of said cams and displaceable by said web, a counterweight on one of said cams for displacing said finger from a vertical position, a pair of switches positioned on opposite sides of said cams and normally inoperative when said finger is in a vertical position but becoming operative selectively when said finger is displaced from a vertical position and a further switch attached to be activated when said finger is displaced a further predetermined amount from said vertical position.

4. A slitter-scorer apparatus comprising a pair of shafts adapted for holding the coacting slitter-scoring device for a web, a first sensor for sensing the position of the web, first hydraulic means for moving said shafts axially from a central position, second hydraulic means for positioning said sensor, electrical means operable by said sensor for controlling said first and second hydraulic means, and independent means for operating said first hydraulic means for moving said shafts independently of said sensing means.

5. A slitter-scorer apparatus comprising a pair of shafts adapted to hold coacting slitting-scoring device for a web, a first hydraulic means for moving said shafts axially, a second hydraulic means for overcoming said first hydraulic means to move said shafts to a central position, a sensor for sensing the position of the edge of said web, and control means including means for displacing the sensor to its extreme inoperative position and for controlling said second means for centering said shafts and for sequentially returning said sensor into contact with said web and for releasing said shafts from a central position and including further means for actuating said first hydraulic means in response to said sensor.

6. A slitter-scorer apparatus comprising a pair of shafts adapted to hold coacting slitting-scoring devices for a web, a first hydraulic means for moving said shafts in a direction transversely of said web, a sensor for determining the edge of said web, a second hydraulic means for moving said sensor, means responsive to said sensor for controlling said first and second means to follow said edge, and means independent of said last named means for blocking said shafts in a position central of their travel and for displacing said sensor to an extreme position from said web.

7. A slitting-scoring apparatus for a web comprising a pair of shafts carrying the slitter-scorers and adapted to move transversely of said web, a sensor responsive to the edge of said web, fluid actuating means for moving said sensor away from said web, a control having a first means for actuating said fluid actuating means for moving said sensor into contact with the edge of said web at one rate of movement and a second means thereafter operable maintaining said sensor in contact with the edge at a different rate of movement, and means responsive to said second means for moving said shafts in response to the movement of said sensor.

References Cited by the Examiner
UNITED STATES PATENTS 3,036,483 5/1962 Porter _____ 83—368 X
3,177,751 4/1965 Vercauteren _____ 83—368 X WILLIAM S. LAWSON, *Primary Examiner.*